(12) United States Patent
Khripkov et al.

(10) Patent No.: US 11,881,630 B2
(45) Date of Patent: Jan. 23, 2024

(54) BEAM STEERING ANTENNA STRUCTURE AND ELECTRONIC DEVICE COMPRISING SAID STRUCTURE

(71) Applicant: Huawei Technologies Co., Ltd., Shenzhen (CN)

(72) Inventors: Alexander Khripkov, Helsinki (FI); Janne Ilvonen, Helsinki (FI); Ruiyuan Tian, Helsinki (FI); Jari Kristian Van Wonterghem, Munich (DE); Jian Ou, Munich (DE); Dongxing Tu, Shenzhen (CN); Zlatoljub Milosavljevic, Helsinki (FI); Hongting Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 17/420,612

(22) PCT Filed: Jan. 3, 2019

(86) PCT No.: PCT/EP2019/050095
§ 371 (c)(1),
(2) Date: Jul. 2, 2021

(87) PCT Pub. No.: WO2020/141018
PCT Pub. Date: Jul. 9, 2020

(65) Prior Publication Data
US 2022/0085497 A1 Mar. 17, 2022

(51) Int. Cl.
*H01Q 1/00* (2006.01)
*H01Q 3/26* (2006.01)
(Continued)

(52) U.S. Cl.
CPC ............ *H01Q 3/26* (2013.01); *H04M 1/0266* (2013.01); *H01Q 1/288* (2013.01); *H01Q 3/00* (2013.01); *H01Q 3/24* (2013.01)

(58) Field of Classification Search
CPC .. H01Q 3/26; H01Q 3/24; H01Q 3/00; H01Q 1/241; H01Q 1/288; H01Q 1/0266
See application file for complete search history.

(56) References Cited

U.S. PATENT DOCUMENTS 9,667,290 B2  5/2017  Ouyang et al.
9,905,922 B2  2/2018  Lee et al.
(Continued)

FOREIGN PATENT DOCUMENTS

WO  2016174699 A1  11/2016

*Primary Examiner* — Joseph J Lauture
(74) *Attorney, Agent, or Firm* — Conley Rose, P.C.

(57) ABSTRACT

A beam steering antenna structure comprises a stacked antenna module and a first conductive component. The antenna module comprises a first substrate and a second substrate arranged superjacent such that main planes of the substrates extend in parallel. The first substrate comprises a first antenna array transmitting and receiving a first radiation beam. The second substrate comprises a second antenna array transmitting and receiving a second radiation beam. The first conductive component extends adjacent to the antenna module and is at least partially separated from the antenna module in a first direction perpendicular to the main plane of the conductive component. The antenna module is coupled to the conductive component by means of at least one of a galvanic, capacitive, or inductive coupling. At least one of the first and the second radiation beams is at least partially steered away from the other one by the first conductive component.

20 Claims, 4 Drawing Sheets

(51) Int. Cl.
    *H04M 1/02*     (2006.01)
    *H01Q 3/00*     (2006.01)
    *H01Q 1/28*     (2006.01)
    *H01Q 3/24*     (2006.01)

(56) References Cited

U.S. PATENT DOCUMENTS

| | | |
|---|---|---|
| 11,528,076 B1 * | 12/2022 | Bily .................. H04B 7/18513 |
| 2015/0070228 A1 | 3/2015 | Gu et al. |
| 2016/0134323 A1 | 5/2016 | Bengtsson et al. |
| 2016/0172761 A1 | 6/2016 | Garcia et al. |
| 2016/0322714 A1 | 11/2016 | Ying et al. |
| 2018/0026341 A1 | 1/2018 | Mow et al. |

* cited by examiner

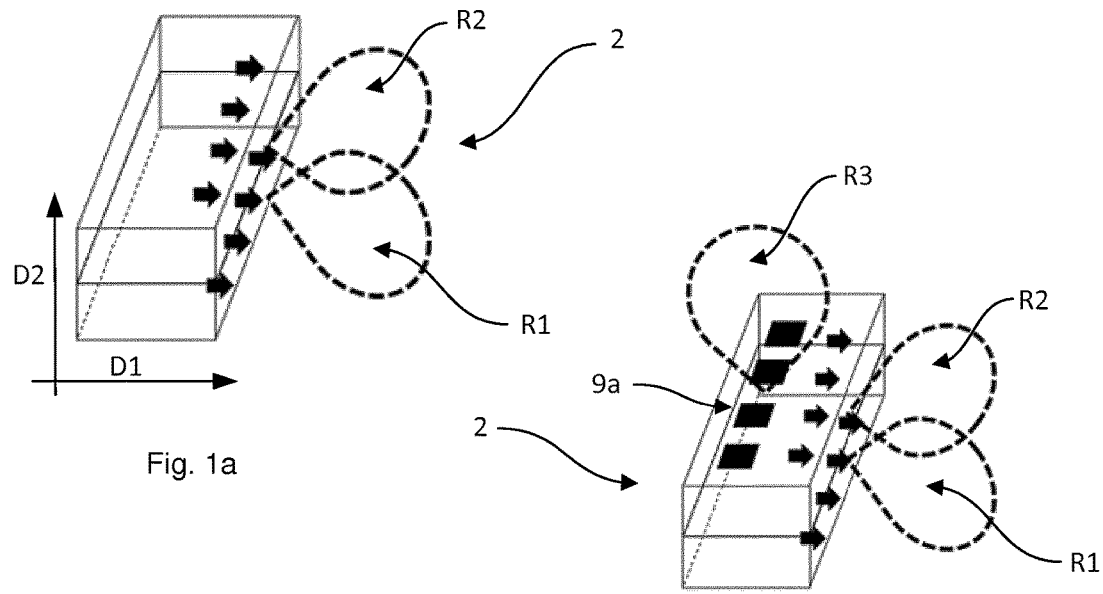
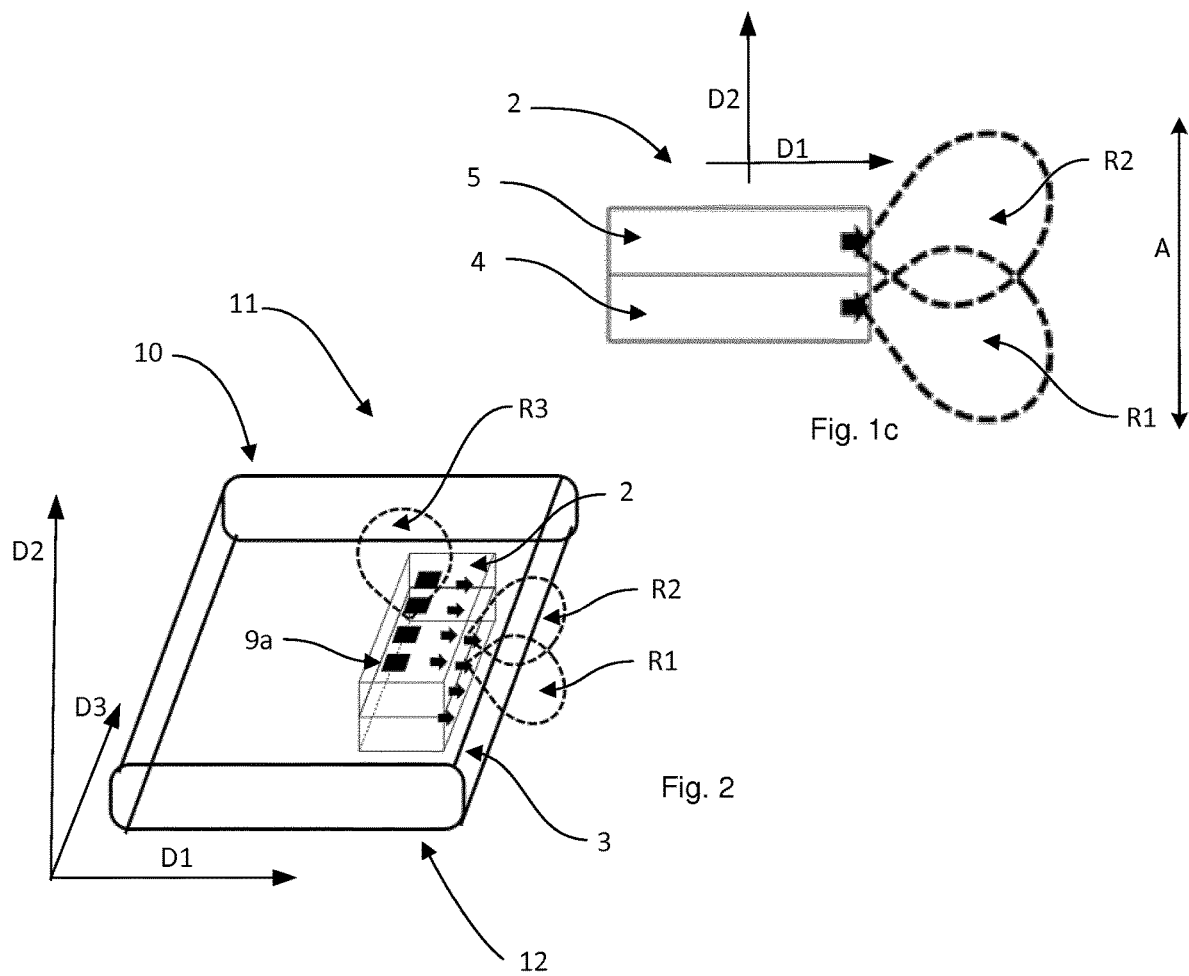

BEAM STEERING ANTENNA STRUCTURE AND ELECTRONIC DEVICE COMPRISING SAID STRUCTURE

CROSS-REFERENCE TO RELATED APPLICATIONS

This application is a National Stage of International Patent Application No. PCT/EP2019/050095 filed on Jan. 3, 2019, which is hereby incorporated by reference in its entirety.

TECHNICAL FIELD

The disclosure relates to a beam steering antenna structure comprising a first antenna array and a second antenna array, and an electronic device comprising the beam steering antenna structure.

BACKGROUND

Electronic devices need to support more and more radio signal technology such as 2G/3G/4G radio. For coming 5G radio technology, the frequency range will be expanded from sub-6 GHz to so called mmWave frequency, e.g. above 20 GHz. For mmWave frequencies, an antenna array will be necessary in order to form a radiation beam with higher gain which overcomes the higher path loss in the propagation media. However, radiation beam patterns with higher gain result in a narrow beam width, wherefore beam steering techniques such as the phased antenna array is used to steer the beam in a specific, desired direction.

Mobile electronic devices, such as mobile phones and tablets, may be oriented in any arbitrary direction. Therefore, such electronic devices need to exhibit an as near full spherical beam coverage as possible. Such coverage is difficult to achieve, i.a. due to the radiation beam being blocked by a conductive housing, a large display, and/or by the hand of the user holding the device.

Conventionally, a mmWave antenna array is arranged next to the display, such that the display does not interfere with the beam coverage. However, the movement towards very large displays, covering as much as possible of the electronic device, makes the space available for the antenna array very limited, forcing either the size of the antenna array to be significantly reduced, and its performance impaired, or a large part of the display to be inactive.

SUMMARY

It is an object to provide an improved electronic device. The foregoing and other objects are achieved by the features of the independent claims. Further implementation forms are apparent from the dependent claims, the description, and the figures.

According to a first aspect, there is provided a beam steering antenna structure comprising a stacked antenna module and a first conductive component, the stacked antenna module comprising a first substrate and a second substrate, the first substrate being arranged superjacent the second substrate such that a main plane of the first substrate extends in parallel with a main plane of the second substrate, the first substrate comprising a first antenna array transmitting and receiving a first radiation beam, the second substrate comprising a second antenna array transmitting and receiving a second radiation beam, the first conductive component extending adjacent the stacked antenna module and being at least partially separated from the stacked antenna module in a first direction perpendicular to a main plane of the conductive component, the stacked antenna module being coupled to the conductive component by means of at least one of a galvanic, capacitive, or inductive coupling, at least one of the first radiation beam and the second radiation beam being at least partially steered in a direction away from the other one of the first radiation beam and the second radiation beam by the first conductive component.

Such a solution allows the radiation beams radiating from the antenna structure to be steered, at least partially, in different or the same directions, such that sufficient gain coverage can be achieved in any direction from the beam steering antenna structure, without negatively affecting the mechanical strength or assembly reliability of the beam steering antenna structure.

In a possible implementation form of the first aspect, the first conductive component is at least partially offset from the stacked antenna module in a second direction perpendicular to the first direction, facilitating the steering of the radiation beams radiating from the antenna structure.

In a further possible implementation form of the first aspect, the first substrate and the second substrate are separated by an interposer, a main plane of the interposer extending in parallel with the main plane of the first substrate, the interposer being at least partially aligned with the first conductive component in the second direction, the interposer keeping the first antenna array and the second antenna array at a distance from each other, which distance can be adjusted to the specific antenna aperture dimensions requested.

In a further possible implementation form of the first aspect, the second substrate further comprises a third antenna array transmitting and receiving a third radiation beam, facilitating use of a complementary antenna array such as a broadside antenna array.

In a further possible implementation form of the first aspect, the first antenna array comprises at least one end-fire antenna element having vertical polarization or horizontal polarization, allowing the polarization to be chosen in accordance with other requirements while still achieving improved beam coverage.

In a further possible implementation form of the first aspect, the second antenna array comprises at least one end-fire antenna element having vertical polarization or horizontal polarization. When different polarizations are utilized, diversity and MIMO applications can be supported by multiplexing different signal streams over the different polarizations.

When the same polarization is utilized, the beam coverage is improved by steering the second radiation beam, transmitted and received by the second antenna array arranged on the second substrate, across the first substrate.

In a further possible implementation form of the first aspect, one of the second antenna array and the third antenna array comprises at least one broadside antenna element, facilitating a radiation beam in a direction at least partially deviating from the direction(s) of the first radiation beam and the second radiation beam.

In a further possible implementation form of the first aspect, end-fire antenna element(s) of the first antenna array extend in the first direction and in parallel with end-fire antenna element(s) of the second antenna array, facilitating an a spatially efficient beam steering antenna structure as possible.

In a further possible implementation form of the first aspect, at least one of the first substrate and the second substrate is a printed circuit board, and the first conductive component extends in a third direction, perpendicular to the first direction and the second direction, in parallel with an edge of the printed circuit board(s), such that existing components are utilized to provide a beam steering antenna structure having improved beam coverage.

In a further possible implementation form of the first aspect, one of the first substrate and the second substrate comprises an RFIC, facilitating an a spatially efficient beam steering antenna structure as possible.

In a further possible implementation form of the first aspect, the first radiation beam and the second radiation beam are vertically polarized, and the second radiation beam interferes constructively with the first radiation beam, facilitating improvement of the beam coverage by steering the second radiation beam, transmitted and received by the second antenna array arranged on the second substrate, across the first substrate.

In a further possible implementation form of the first aspect, the beam steering antenna structure further comprises a second conductive component, the second radiation beam extending between the first conductive component and the second conductive component, facilitating use of existing components to improve the beam coverage without affecting the mechanical stability or dimensions of the beam steering antenna structure.

In a further possible implementation form of the first aspect, at least one of the first substrate, the interposer, and the second substrate is connected to the first conductive component or the second conductive component by means of a dielectric material, facilitating a secure and functional interconnection between antenna module and remaining beam steering components.

In a further possible implementation form of the first aspect, the beam steering antenna structure comprises an effective antenna aperture which expands, in the second direction, while extending in the first direction, such that sufficient gain coverage can be achieved in any direction from the beam steering antenna structure, without negatively affecting the mechanical strength or assembly reliability of the beam steering antenna structure.

According to a second aspect, there is provided an electronic device comprising a display, a back cover, and a beam steering antenna structure according to the above, the back cover being connected to the second substrate of the beam steering antenna structure, the first conductive component of the beam steering antenna structure being a metal frame extending between peripheral edges of the display and the back cover, a first gap separating the metal frame from the display such that the first radiation beam can radiate past the metal frame through the first gap, the metal frame being connected to the back cover such that the second radiation beam and the third radiation beam can radiate past the metal frame on a side opposite to the first gap.

Such a solution allows the radiation beams radiating from the antenna structure to be steered, at least partially, in different or same directions, such that sufficient gain coverage can be achieved in any direction from the electronic device, without negatively affecting the mechanical strength, assembly reliability, or industrial design of the electronic device.

In a possible implementation form of the second aspect, a second gap separates the metal frame from the back cover such that the second radiation beam and the third radiation beam can radiate through the second gap, improving the beam coverage in a direction towards the back of the electronic device.

In a further possible implementation form of the second aspect, the beam steering antenna structure comprises a second conductive component, the back cover being connected to the second substrate by means of the second conductive component, the second gap separating the metal frame from the second conductive component, improving the beam coverage in a direction towards the back of the electronic device and taking advantage of conductive components.

In a further possible implementation form of the second aspect, the effective antenna aperture of the beam steering antenna structure expands in a second direction extending parallel with a main plane of the metal frame, one end of the effective antenna aperture, arranged immediately adjacent the stacked antenna module, having the same dimension as the stacked antenna module in the second direction, a second end of the effective antenna aperture, arranged immediately adjacent the metal frame, having a dimension corresponding to at least a height of the metal frame, in the second direction. This allows sufficient gain coverage to be achieved in any direction from the electronic device, without affecting the dimensions of the other components of the electronic device, since the size of the antenna aperture is increased by means of said other components.

In a further possible implementation form of the second aspect, the second end of the effective antenna aperture has a dimension corresponding to the distance between a surface of the first substrate facing the display and the second gap, in the second direction, allowing the beam steering antenna structure to have as small dimensions as possible at the point where the radiation beams are generated, e.g. at the printed circuit boards.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 1a shows a schematic perspective view of a stacked antenna module of a beam steering antenna structure in accordance with one embodiment of the present invention;

FIG. 1b shows a schematic perspective view of a stacked antenna module of a beam steering antenna structure in accordance with a further embodiment of the present invention;

FIG. 1c shows a schematic side view of the embodiment of FIG. 1a;

FIG. 2 shows a schematic perspective view of an electronic device in accordance with one embodiment of the present invention;

FIG. 3a shows a schematic perspective view of a substrate of a beam steering antenna structure in accordance with one embodiment of the present invention;

FIG. 3b shows a top view of the embodiment of FIG. 3a;

FIG. 4a shows a schematic perspective view of a substrate of a beam steering antenna structure in accordance with a further embodiment of the present invention;

FIG. 4b shows a top view of the embodiment of FIG. 4a;

DETAILED DESCRIPTION

Figure 5A:
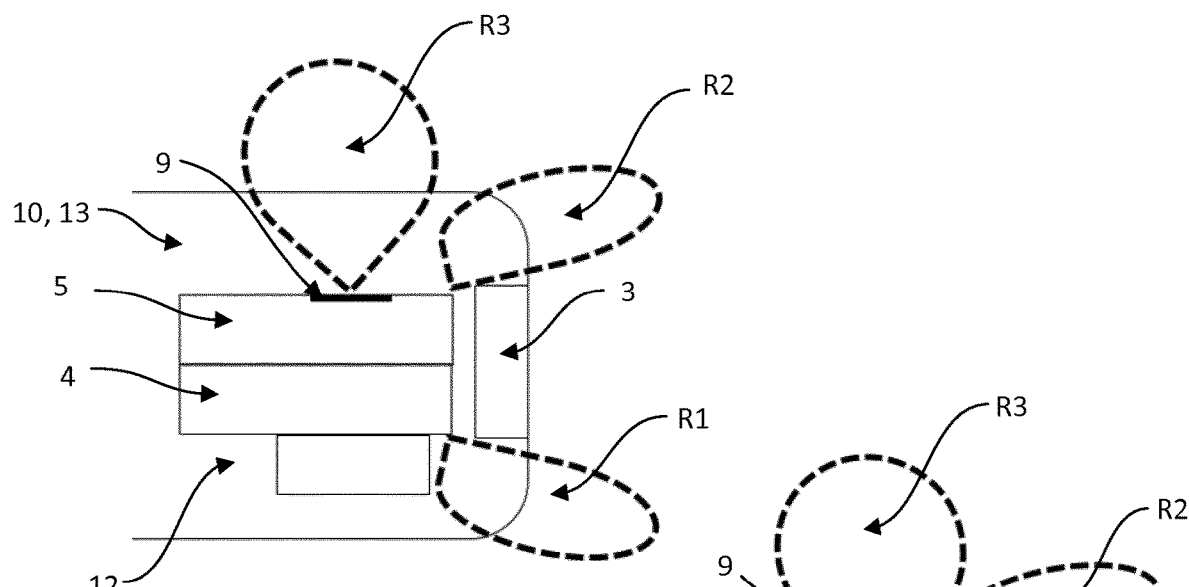
FIG. 5a shows a schematic cross-sectional view of an electronic device in accordance with one embodiment of the present invention.
Figure 5B:
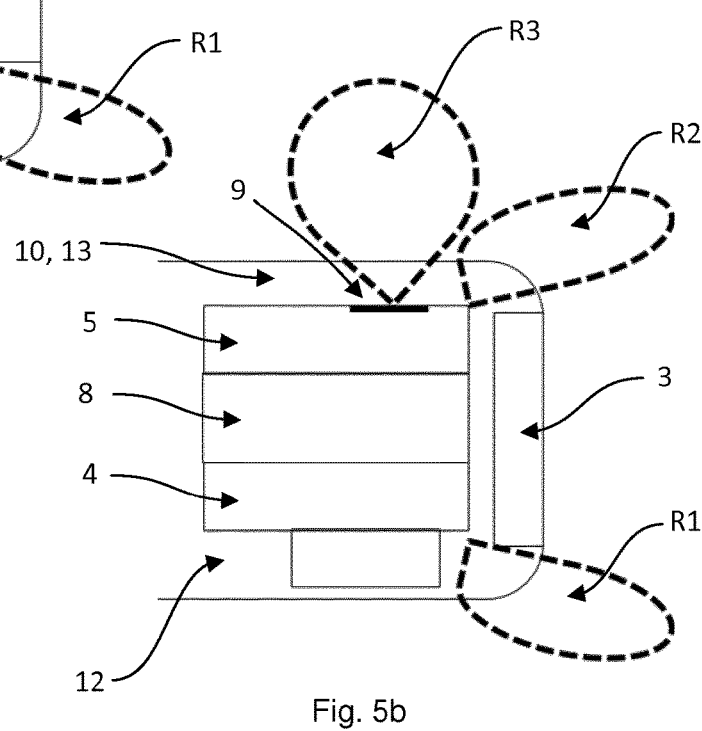
FIG. 5b shows a schematic cross-sectional view of an electronic device in accordance with a further embodiment of the present invention.
Figure 5C:
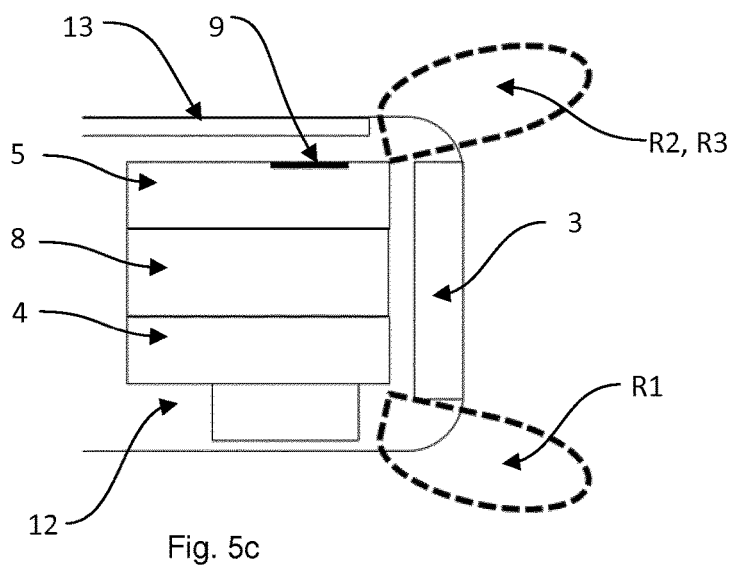
FIG. 5c shows a schematic cross-sectional view of an electronic device in accordance with a further embodiment of the present invention.

FIGS. 5a to 5c show schematically a beam steering antenna structure 1 comprising a stacked antenna module 2 and a first conductive component 3. The stacked antenna module 2 comprises a first substrate 4 and a second substrate 5, the second substrate 5 being arranged at least partially superjacent the first substrate 4 such that a main plane of the first substrate 4 extends in parallel with a main plane of the second substrate 5, as shown also in FIGS. 1a to 1c. The first substrate 4 and the second substrate 5 may be arranged directly in abutment with each other, or the first substrate 4 and the second substrate 5 may be separated by an interposer 8, a main plane of the interposer 8 extending in parallel with the main plane of the first substrate 4, and subsequently, the main plane of the second substrate 5. The interposer 8 is at least partially aligned with the first conductive component 3 in the second direction D2, as shown in FIGS. 5a to 5c.

Figure 7:
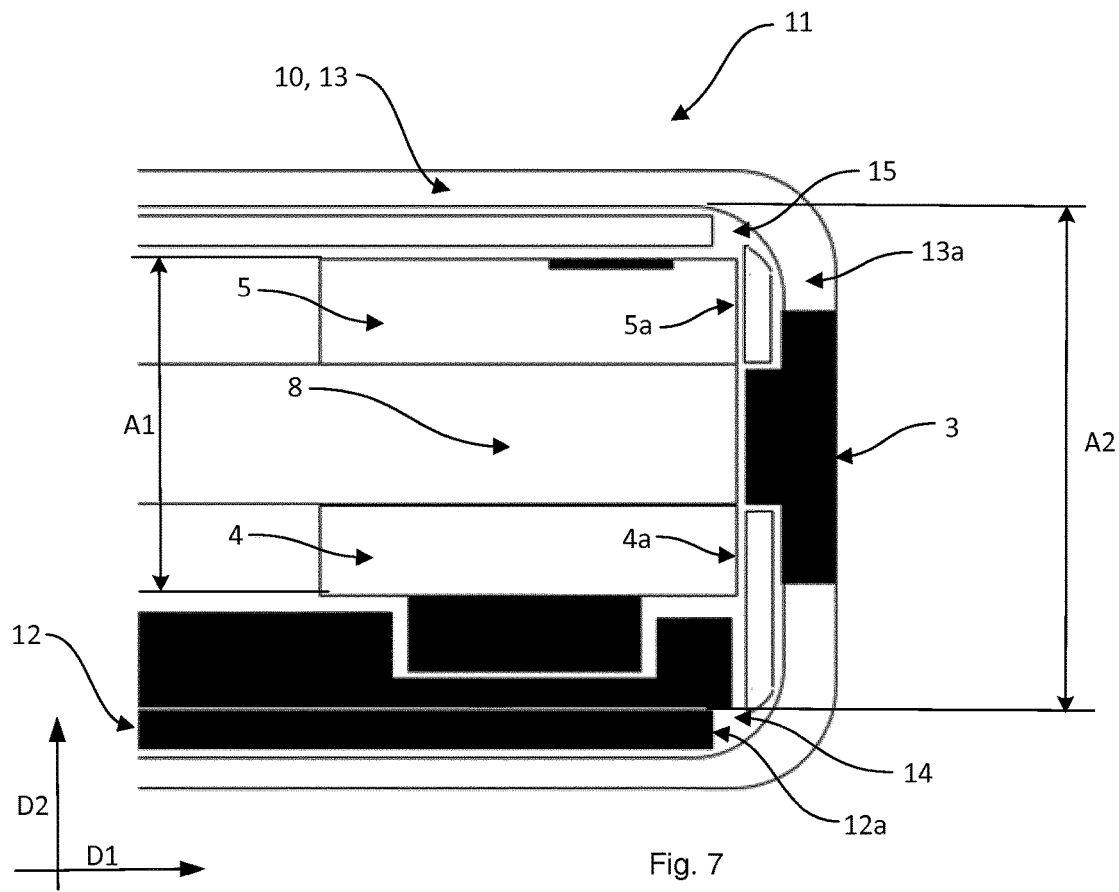
FIG. 7 shows a cross-sectional view of an electronic device in accordance with an embodiment of the present invention.

The first conductive component 3 extends adjacent the stacked antenna module 2 and is at least partially separated from the stacked antenna module 2 in a first direction D1 perpendicular to the second direction D2 and perpendicular to the main plane of the conductive component 3. Furthermore, the first conductive component 3 may be at least partially offset from the stacked antenna module 2 in the second direction D2, as shown in FIG. 7.

The stacked antenna module 2 is coupled to the conductive component 3 by means of at least one of a galvanic and an electromagnetic, i.e. capacitive or inductive, coupling. The gap which separates the conductive component 3 from the stacked antenna module 2 may be bridged by the galvanic, capacitive, or inductive coupling and may at least partially be filled with dielectric material. The coupling comprises a contact member having a contact area $A_c$ and a gap separating adjacent conductors by a distance d. For a galvanic coupling, the contact member comprises a conductor, i.e. $\varepsilon_r$ is infinitely large, and sufficient contact is achieved since the achieved capacitance is infinitely large. Alternatively, the coupling may comprise filling the above-mentioned gap with a dielectric material, where $\varepsilon_r >= 1$. A sufficient electromagnetic coupling can be determined by using an equivalent circuit model. With a substrate contact member, the contact area $A_c$ and the distance d determine the achieved capacitance and frequency response. Sufficient electromagnetic coupling is attained with a large capacitance, which results in a small impedance.

The first substrate 4 comprises a first antenna array 6 transmitting and receiving a first radiation beam R1, and the second substrate 5 comprises a second antenna array 7 transmitting and receiving a second radiation beam R2, as shown in FIGS. 3a to 3b and 4a to 4b. The first conductive component 3 steers, at least partially, at least one of the first radiation beam R1 and the second radiation beam R2 in a direction away from the other one of the first radiation beam R1 and the second radiation beam R2. This is schematically indicated in FIGS. 5a to 5c. All FIGS. show radiation beams R1 and R2 radiating from only one side of the stacked antenna module 2, however, corresponding radiation beams R1 and R2 may radiate also from the opposite side of the stacked antenna module 2, facilitating omni coverage. Furthermore, the stacked antenna modules 2 shown in FIGS. 5a to 5c may be rotated 90°, such that the main planes of the substrates 4, 5 extend in parallel with the main plane of the first conductive component 3. FIGS. 5a to 5c show the main planes of the substrates 4, 5 extending perpendicular to the main plane of the first conductive component 3. The extent of the first radiation beam R1 and the second radiation beam R2 may be completely separated by the first conductive component 3.

In one embodiment, the second substrate 5 further comprises a third antenna array 9 transmitting and receiving a third radiation beam R3, as shown in FIGS. 1b, 2, and 5a to 5c. The third antenna array 9 may comprise at least one broadside antenna element 9a such as a patch antenna. The broadside radiation beam R3 has a direction essentially perpendicular to the main plane of the second substrate 5, as shown in FIGS. 1b and 2.

The first antenna array 6 may comprise at least one end-fire antenna element 6a having vertical polarization or horizontal polarization. Correspondingly, the second antenna array 7 may comprise at least one end-fire antenna element 7a having vertical polarization or horizontal polarization.

The denominations "horizontal" and "vertical" indicate the direction of the electric field in relation to the earth's surface. Since an electronic device such as a mobile phone, comprising the beam steering antenna structure 1, can be held and used in any direction in relation to the earth's surface, "horizontal" and "vertical" indicate the polarization directions when the electronic device is placed on a surface essentially parallel with the earth's surface. In such a case, the vertically polarized signals oscillate from top to bottom such that the electric field is perpendicular to the earth's surface. Correspondingly, the horizontally polarized signals oscillate from left to right such that the electric field is parallel to the earth's surface.

Figures 3A, 3B:
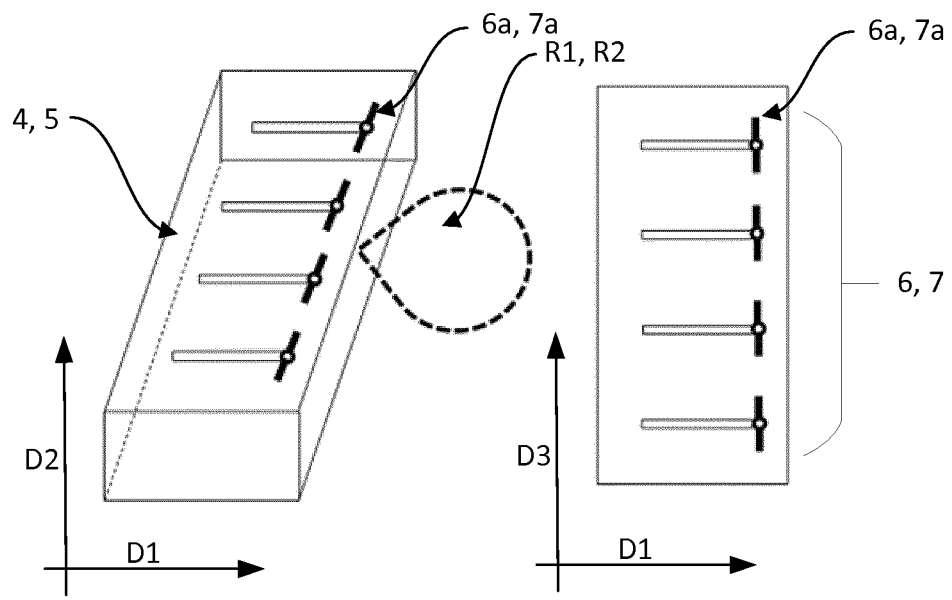
Figures 4A, 4B:
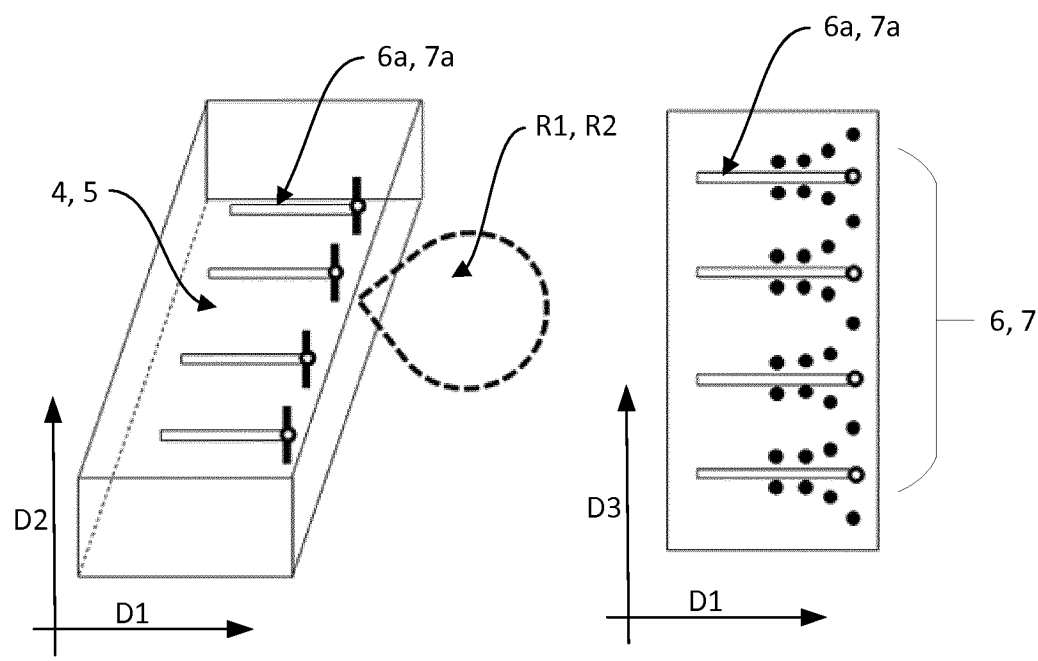

FIGS. 3a and 3b show a first antenna array 6 and/or a second antenna array 7 comprising end fire antenna elements 6a, 7a having horizontal polarization. FIGS. 4a and 4b show a first antenna array 6 and/or a second antenna array 7 comprising end fire antenna elements 6a, 7a having vertical polarization. The antenna arrays 6, 7 may comprise a horizontally placed dipole antenna or a tapered antenna radiator. Furthermore, the antenna arrays 6, 7 may comprise a vertically placed dipole antenna or a substrate integrated waveguide antenna. As mentioned above, the stacked antenna modules 2 shown in FIGS. 5a to 5c may be rotated 90°, such that the main planes of the substrates 4, 5 extend in parallel with the main plane of the first conductive component 3. For such an embodiment, the above mentioned vertical and horizontal polarizations would change places, such that the polarization shown in FIGS. 3a and 3b, when turned 90°, would be a vertical polarization and the polarization shown in FIGS. 4a and 4b, when turned 90°, would be a horizontal polarization.

In one embodiment, the end-fire antenna elements 6a of the first antenna array 6 have vertical polarization and the end-fire antenna elements 7a of the second antenna array 7 have horizontal polarization. In a further embodiment, the end-fire antenna elements 6a of the first antenna array 6 have horizontal polarization and the end-fire antenna elements 7a of the second antenna array 7 have vertical polarization. In yet another embodiment, both the end-fire antenna elements 6a of the first antenna array 6 and the end-fire antenna elements 7a of the second antenna array 7 have vertical polarization. In a further embodiment, both the end-fire antenna elements 6a of the first antenna array 6 and the end-fire antenna elements 7a of the second antenna array 7 have horizontal polarization. When different polarizations are utilized, diversity and MIMO applications can be supported by multiplexing different signal streams over the different polarizations.

When the same polarization is utilized, the beam coverage is improved by steering the second radiation beam R2, transmitted and received by the second antenna array 7a arranged on the second substrate 5, across the first substrate 4.

In one embodiment, one of the second antenna array 7 and the third antenna array 9 comprises at least one broadside antenna element 9a, as shown schematically in FIG. 1b.

The end-fire antenna elements 6a of the first antenna array 6 may extend essentially in the first direction D1 and in parallel with end-fire antenna elements 7a of the second antenna array 7.

In one embodiment, at least one of the first substrate 4 and the second substrate 5 is a printed circuit board. The first conductive component 3 extends in a third direction D3, perpendicular to the first direction D1 and the second direction D2, and in parallel with an edge 4a, 5a of the printed circuit boards. As shown in FIGS. 2 and 7, direction D1 corresponds to the thickness of an electronic device 11 comprising the beam steering antenna structure 1, direction D2 corresponds to the width of the electronic device 11, and direction D3 corresponds to the height or length of the electronic device 11.

At least one of the first substrate 4 and the second substrate 5 may comprise additional electronic components such as an RFIC, a Radio Frequency Integrated Circuit, or related circuitry such as the power supply and management, which is indicated in FIGS. 5a to 5c as connected to the first substrate 4.

In one embodiment, the first radiation beam R1 and the second radiation beam R2 are both vertically polarized, and the second radiation beam R2 interferes constructively with the first radiation beam R1, i.e. the first antenna array 6 and the second antenna array 7 together form and steer the radiation beams R1, R2 across the substrates 4, 5.

The beam steering antenna structure 1 may further comprise a second conductive component 10, as shown in FIGS. 5c and 7, in which case the second radiation beam R2 extends between the first conductive component 3 and the second conductive component 10.

At least one of the first substrate 4, the interposer 8, and the second substrate 5 is connected to the first conductive component 3 or the second conductive component 10 by means of a dielectric material, as shown in FIG. 7.

In one embodiment, shown in FIG. 7, the beam steering antenna structure 1 comprises an effective antenna aperture A which expands, in the second direction D2, while extending in the first direction D1. The expansion may be facilitated by the interposer 8, at least partially aligned with the first conductive component 3 in the second direction D2, as shown in FIGS. 5a to 5c. The interposer 8 is arranged between the first substrate 4 and the second substrate 5 and hence keeps the first antenna array 6 and the second antenna array 7 at a distance from each other. The distance may be adjusted to the specific antenna aperture dimensions requested. The interposer 8 preferably comprises ground and signal vias, shown in FIG. 4b, used for electronically interconnecting the first antenna array 6 and the second antenna array 7.

The present disclosure further relates to an electronic device 11 comprising a display 12, a back cover 13, and the above described beam steering antenna structure 1. The back cover 13 is connected to the second substrate 5 of the beam steering antenna structure 1. The first conductive component 3 of the beam steering antenna structure 1 is preferably a metal frame, however, the first conductive component 3 could be any metal component. The metal frame 3 extends between the peripheral edges 12a, 13a of the display 12, or the display glass covering the display, and the back cover 13, forming a rim extending between the two, as shown in FIG. 7. The back cover 13 may be made of a conductive material such as metal, or of a non-conductive and radiation transparent material.

A first gap 14 separates the metal frame 3 from the display 12 such that the first radiation beam R1 can radiate past the metal frame 3 through the first gap 14, i.e. in a direction generally towards the display 12.

The metal frame 3 is connected to the back cover 13 such that the second radiation beam R2 and the optional third radiation beam R3 can radiate past the metal frame 3 on a side opposite to the first gap 14, i.e. in a direction generally towards the back cover 13. If the back cover 13 is non-conductive and radiation transparent, the second radiation beam R2 and the optional third radiation beam R3 can radiate through the back cover 13, as roughly indicated in FIGS. 5a and 5b.

In one embodiment, the beam steering antenna structure 1 comprises a second conductive component 10, and the back cover 13 is connected to the second substrate 5 by means of the second conductive component 10. A second gap 15 separates the metal frame 3 from the second conductive component 10, such that the second radiation beam R2 and the optional third radiation beam R3 can radiate through the second gap 15, as indicated in FIG. 5c.

At least one of the first gap 14 and the second gap 15 may be at least partially filled with a dielectric material, as shown in FIG. 7.

The back cover 13 may be made of a conductive material, and hence form an additional conductive component, and the back cover 13, the metal frame 3, and the display 12 may be interconnected by an insert molded plastic chassis. Furthermore, the back cover 13 may be an integral part of the second conductive component 10.

Figure 6:
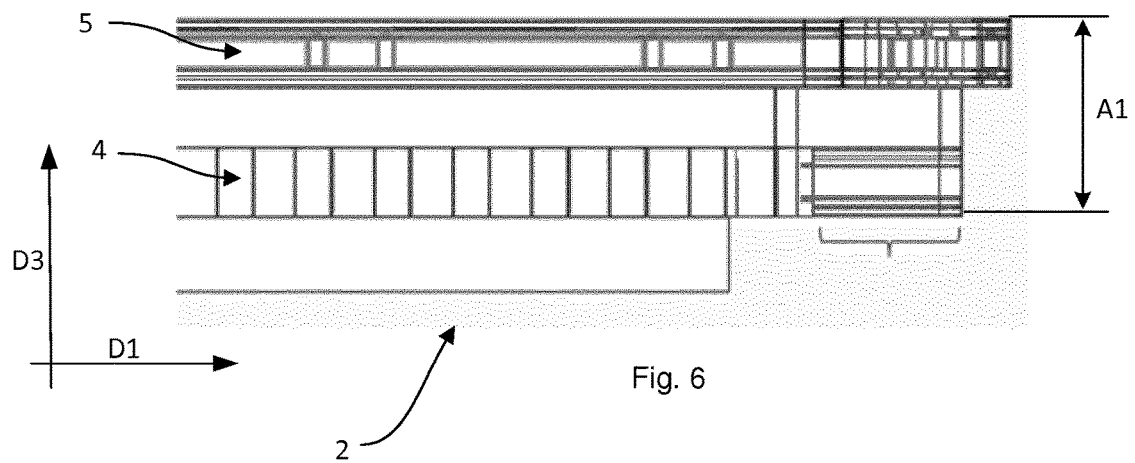
FIG. 6 shows a cross-sectional view of a stacked antenna module of a beam steering antenna structure in accordance with an embodiment of the present invention.

As shown in FIG. 7, and mentioned above, the effective antenna aperture A of the beam steering antenna structure 1 may expand in a second direction D2 extending in parallel with a main plane of the first conductive component, i.e. metal frame 3. One end A1 of the effective antenna aperture A, arranged immediately adjacent the stacked antenna module 2, has the same dimension as the stacked antenna module 2 in the second direction D2, as shown in FIG. 6. A second end A2 of the effective antenna aperture A, arranged immediately adjacent the metal frame 3, has a dimension corresponding to at least a height of the metal frame 3, in the second direction D2. The second end A2 of the effective antenna aperture A may extend all the way to the back cover 13, in particular in an embodiment comprising a non-conductive and radiation transparent back cover 13 through which a third radiation beam R3 radiates.

In one embodiment, the second end A2 of the effective antenna aperture A has a dimension corresponding to the distance between a surface of the first substrate 4 facing the display 12 and the second gap 15, in the second direction D2.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. A beam steering antenna structure comprising:
    a stacked antenna comprising:
        a first substrate comprising a first antenna array configured to transmit and receive a first radiation beam; and
        a second substrate comprising a second antenna array configured to transmit and receive a second radiation beam, wherein the first substrate is disposed superjacent to the second substrate such that a main plane of the first substrate is parallel with a main plane of the second substrate; and
    a first conductive component coupled to the stacked antenna using a galvanic, capacitive, or inductive coupling,
    wherein the first conductive component extends adjacent to the stacked antenna and is at least partially separated from the stacked antenna in a first direction perpendicular to a main plane of the first conductive component, and
    wherein the first conductive component is configured to at least partially steer at least one of the first radiation beam or the second radiation beam in a direction away from the other one of the first radiation beam or the second radiation beam.

2. The beam steering antenna structure of claim 1, wherein the first conductive component is at least partially offset from the stacked antenna in a second direction perpendicular to the first direction.

3. The beam steering antenna structure of claim 1, further comprising an interposer between the first substrate and the second substrate,
    wherein a main plane of the interposer is parallel to the main plane of the first substrate, and
    wherein the interposer is at least partially aligned with the first conductive component in the second direction.

4. The beam steering antenna structure of claim 1, wherein the second substrate further comprises a third antenna array configured to transmit and receive a third radiation beam.

5. The beam steering antenna structure of claim 4, wherein one of the second antenna array or the third antenna array comprises a broadside antenna element.

6. The beam steering antenna structure of claim 1, wherein the first antenna array comprises an end-fire antenna element having vertical polarization or horizontal polarization.

7. The beam steering antenna structure of claim 1, wherein the second antenna array comprises an end-fire antenna element having vertical polarization or horizontal polarization.

8. The beam steering antenna structure of claim 1, wherein the first antenna array comprises a first end-fire antenna element, and wherein the second antenna array comprises a second end-fire antenna element that extends in the first direction and that is parallel with the first end-fire antenna element.

9. The beam steering antenna structure of claim 1, wherein at least one of the first substrate or the second substrate is a printed circuit board, and wherein the first conductive component extends in a third direction that is perpendicular to the first direction and the second direction and that is parallel to an edge of the printed circuit board.

10. The beam steering antenna structure of claim 9, wherein one of the first substrate and the second substrate further comprises a radio frequency integrated circuit.

11. The beam steering antenna structure of claim 1, wherein the first radiation beam and the second radiation beam are vertically polarized, and wherein the second radiation beam is configured to constructively interfere with the first radiation beam.

12. The beam steering antenna structure of claim 1, further comprising a second conductive component coupled to the first conductive component, wherein the second radiation beam is configured to extend between the first conductive component and the second conductive component.

13. The beam steering antenna structure of claim 1, further comprising:
    a second conductive component coupled to the first conductive component; and
    an interposer between the first substrate and the second substrate,
    wherein at least one of the first substrate, the interposer, or the second substrate is coupled to the first conductive component or the second conductive component using a dielectric material.

14. The beam steering antenna structure of claim 1, wherein the beam steering antenna structure further comprises an effective antenna aperture configured to expand in the second direction while extending in the first direction.

15. An electronic device comprising:
    a display;
    a back cover; and
    a beam steering antenna structure comprising:
        a stacked antenna comprising:
            a first substrate comprising a first antenna array configured to transmit and receive a first radiation beam; and
            a second substrate coupled to the back cover and comprising a second antenna array configured to transmit and receive a second radiation beam, wherein the first substrate is disposed superjacent to the second substrate such that a main plane of the first substrate is parallel with a main plane of the second substrate; and a first conductive component coupled to the stacked antenna using a galvanic, capacitive, or inductive coupling, wherein the first conductive component extends adjacent to the stacked antenna and is at least partially separated from the stacked antenna in a first direction perpendicular to a main plane of the first conductive component, wherein the first conductive component is configured to at least partially steer at least one of the first radiation beam or the second radiation beam in a direction away from the other one of the first radiation beam or the second radiation beam, wherein the first conductive component is a metal frame extending between peripheral edges of the display and the back cover, wherein a first gap separates the metal frame from the display to enable the first radiation beam to radiate past the metal frame through the first gap.

16. The electronic device of claim 15, wherein the second substrate further comprises a third antenna array configured to transmit and receive a third radiation beam, and wherein the metal frame is coupled to the back cover to enable the second radiation beam and the third radiation beam to radiate past the metal frame on a side opposite to the first gap.

17. The electronic device of claim 16, wherein a second gap separates the metal frame from the back cover to enable the second radiation beam and the third radiation beam to radiate through the second gap.

18. The electronic device of claim 17, wherein the beam steering antenna structure further comprises a second conductive component, wherein the back cover is coupled to the second substrate using the second conductive component, and wherein the second gap separates the metal frame from the second conductive component.

19. The electronic device of claim 17, wherein the beam steering antenna structure further comprises an effective antenna aperture configured to expand in a second direction extending parallel to a main plane of the metal frame, wherein one end of the effective antenna aperture that is arranged immediately adjacent to the stacked antenna has a same dimension as the stacked antenna module in the second direction, and wherein a second end of the effective antenna aperture that is arranged immediately adjacent to the metal frame has a dimension corresponding to at least a height of the metal frame in the second direction.

20. The electronic device of claim 19, wherein the second end of the effective antenna aperture has a dimension corresponding to a distance between a surface of the first substrate facing the display and the second gap in the second direction.

* * * * *